United States Patent

[11] 3,604,238

| | | |
|---|---|---|
| [72] | Inventor | Akira Asari<br>Osaka, Japan |
| [21] | Appl. No. | 812,145 |
| [22] | Filed | Apr. 1, 1969 |
| [45] | Patented | Sept. 14, 1971 |
| [73] | Assignee | Kobe Steel Ltd. |
| [32] | Priority | Apr. 3, 1968, Aug. 24, 1968 |
| [33] | | Japan |
| [31] | | 43/21932 and 43/60764 |

[54] APPARATUS FOR THE PRODUCTION OF STEEL PIPES BY EXTRUSION
2 Claims, 4 Drawing Figs.

[52] U.S. Cl. .................................................. 72/206,
72/228, 72/250, 72/256
[51] Int. Cl. ..................................................... B21b 15/00,
B21c 23/00
[50] Field of Search ........................................... 72/256,
257, 221, 228, 206; 80/31 B; 29/33.4, 81.6, 33.15

[56] References Cited
UNITED STATES PATENTS

| | | | | |
|---|---|---|---|---|
| 1,100,695 | 6/1914 | Offutt ............................ | 29/33.4 X |
| 1,826,360 | 10/1931 | Mazurie et al. ................ | 80/31.1 X |
| 1,951,066 | 3/1934 | Shelly ............................ | 29/81.6 |
| 1,986,833 | 1/1935 | Littler ............................ | 29/33.4 X |
| 2,306,771 | 12/1942 | Bannister ....................... | 72/206 X |
| 2,959,849 | 11/1960 | Rubin ............................ | 29/33.4 X |

*Primary Examiner*—Milton S. Mehr
*Attorney*—Wenderoth, Lind & Ponack

ABSTRACT: A steel pipe production apparatus has a pipe production portion and a steel pipe treatment portion. The pipe production portion has two or more systems of pipe production lines, one of which is an extruded pipe-producing apparatus and the other of which is an extruded pipe-producing apparatus or a rolled pipe-producing apparatus. The steel pipe treatment portion is downstream of said pipe production portion and has one system which is a hot rolling line and one or more systems which are hot lines. The hot rolling lines include a stretch reducer for reducing steel pipes supplied from the pipe production portion. The hot lines include means for after-treating steel pipes supplied from the pipe production portion. Transfer means are provided between said pipe production portion and said steel pipe treatment portion for enabling steel pipes from the pipe production line to be selectively delivered to any one of the hot rolling line or the hot lines.

AKIRA ASARI,
Inventor

By Wenderoth, Lind
and Ponack. Attorneys

APPARATUS FOR THE PRODUCTION OF STEEL PIPES BY EXTRUSION

The present invention relates to seamless steel pipe production equipment.

Production systems for such seamless steel pipe presently used on an industrial scale are the following:
1. An extrusion system,
2. So-called rolling systems, including the mandrel mill system and the Mannesmann plug mill system.

The first, the extrusion system is well suited for the production of articles which are diversified in point of size, shape and material as compared with other systems.

Thus, such system is capable of producing steel pipes in a wider range of sizes (steel pipe diameter, wall thickness, etc.) than other systems and, moreover, lends itself to easy size change by changing dies and mandrels. Further, such extrusion system is capable of producing irregular-shaped steel pipes which cannot be produced by other systems. Further, with such extrusion system, the production of stainless steel pipes, alloy steel pipes, zircalloy pipes, titanium pipes etc., which is difficult with other systems, is made possible by utilization of a lubricant. Of such systems, the Ugine-Sejournet process, which uses glass for lubrication of the billets, provides a very good finish on the inner and outer surfaces of the resulting steel pipe and, owing to low friction on dies and mandrels, makes possible the use of long billets and the production of long steel pipes (80–100 m. at maximum) which is impossible with other pipe production systems.

Such extrusion system has many desirable features as described above, but owing to its fundamental principle of being a batch system, the production efficiency is poor as compared with other systems, this being the primary disadvantage of the extrusion system.

On the other hand, with the rolling system, as compared with the extrusion system, the size range is narrow and changing sizes is difficult so that such system is not suitable for the production of articles which are diversified in point of size, shape and material. However in view of the fact that such rolling system is a continuous system, high efficiency production is possible within particular size ranges and particularly the mandrel mill system can produce steel pipes of high quality as compared with the other rolling systems.

To sum up, the extrusion system is well suited for diversified but small lot production in a wide range of sizes, while the rolling system is well suited for nondiversified but large lot production in a narrow range of sizes.

In the past, irrespective of the pipe production system employed, development activities for increasing the efficiency of pipe production equipment and decreasing the cost of production of pipes have been devoted exclusively to the achievement of improvements in the pipe producing apparatus such as extruded pipe producing apparatus and rolled pipe producing apparatus. In sharp contrast to such prior art concept, the present invention is based on an absolutely novel idea, aiming at the rationalization of pipe producing operation by improving the entire pipe production system including pipe producing apparatus, such as an extruded pipe producing apparatus and/or a rolled pipe producing apparatus. Therefore, whereas prior development activities are based on a microscale concept, the present invention is based on a macroscale concept.

A first object of the present invention is to improve the entire pipe production system and hence rationalize the pipe producing operation so that the capacities of all apparatus constituting the pipe production system, including the pipe producing apparatus such as extruded pipe producing apparatus and rolled pipe producing equipment may always be developed to the full.

Stated more concretely, when an extrusion press is employed as a pipe producing apparatus, the sizes of the steel pipes which can be extruded while effectively utilizing the capacity of said extrusion press are uniquely determined on the basis of factors including the deformation resistance of billets, uniquely determined by the amount of the maximum extrusion force of said extrusion press, the inner diameter of the container of said extrusion press—in other words, the outer diameter of billets to be extruded—, the material of billets to be extruded and the heating temperature, and the frictional resistance of billets uniquely determined by the lubricated condition of billets—in other words, the lubricant used (at present, glass powder is chiefly used). In other words, the upper and lower limits of the sizes of steel pipes at which the capacity of the extrusion press can be effectively developed are uniquely determined by said factors, the upper limit being determined chiefly by the allowable limit of compression resistance of the extrusion stem, such allowable limit being uniquely determined by the shape of the extrusion stem determined by the diameter of the container and the diameter (corresponding to the inner diameter of the extruded steel pipe) of the mandrel passing through the extrusion stem. The lower limit is determined chiefly by an extrusion-incapable range dependent on the relation between the inner diameter of the container and the amount of the extrusion force. This is shown by way of example in FIG. 3. In the graph shown therein, the outer diameter of steel pipes to be extruded is plotted on the vertical axis and the wall thickness thereof on the horizontal axis. The graph shows a case in which the distortion resistance of the billets is 24 kg./cm². Thus with an extrusion press whose maximum extrusion force is 5500 tons and in which the inner diameter of the container is 370 mm., it follows that the capacity of this extrusion press is effectively developed when the extruded pipes have those sizes which are in the range (A) defined by an upper limit line ($au$) and a lower limit line ($al$). Similarly, with a 310 mm., 5000-ton extrusion press, the capacity of the press is effectively developed when extruding those sizes which are in the range (B) defined by an upper limit line ($bu$) and a lower limit line ($bl$) and with a 350 mm., 3600-ton extrusion press, the capacity of the press is effectively developed when extruding those sizes which are in the range (C) defined by an upper limit line ($cu$) and a lower limit line ($cl$).

Therefore, in this extrusion-capable range, different sizes of steel pipes can be easily extruded by changing mandrels and dies as previously described. In other words, it is only when within the extrusion-capable range peculiar to the particular extrusion press that extrusion is possible. Conventionally, when it is desired to extrude steel pipes with a small diameter lying below the lower limit of this range, extrusion is effected by changing the container for one having a smaller diameter and controlling the extrusion force so as to be below the maximum extrusion force. The operation of changing containers is time consuming because of the heavy weight of the container and the narrowness of the space available for such operation. This forms the cause of decreasing the rate of operation of the extrusion production system and of increasing the cost of pipe production. Particularly the stoppage of the extrusion press constituting the principal portion of the extrusion equipment influences the entire extrusion production system and the influence on the cost of production is large. Further, the inefficient use of the maximum extrusion force of the extrusion press not only causes a decrease in the efficiency of the extrusion press but also produces an influence on the entire extrusion production system, thus forming the cause of the increase of the cost of production. Further, at present lubrication and other factors prevent the use of a billet which is relatively long as compared with its diameter. In other words, the ratio (L/D) of the billet length (L) to the billet diameter (D) is limited by lubrication, thermal influence on tools, etc. Therefore as described above the decrease of the diameter of billets used eventually results in the use of billets small in unit weight, which, coupled with the suppression on the extrusion force as described above, greatly decreases the extrusion efficiency.

On the other hand, steel pipe extrusion production involves three situations, one in which the steel pipe hot-extruded by the extrusion press is used in that condition; another in which after being hot extruded by the extrusion press the pipe is further hot rolled as by a stretch reducing mill to become a more slender steel pipe product; and the other in which, of the steel pipes produced by hot extrusion or hot rolling as described above, those pipes which must be further decreased in diameter or must be further improved in surface quality, dimensional accuracy and mechanical properties are worked on a cold rolling machine or a hot drawing machine. In this way the steel pipe extrusion production system includes not only an extrusion press, but also many apparatus found in the processes subsequent to the hot extrusion process. Therefore, it is seen that in equipment where these additional apparatus cannot be properly operated, even if the performance of the extrusion apparatus itself is improved, the overall operation cannot be said to be improved.

The same may also be said of the rolled pipe producing apparatus.

For the above-mentioned reasons, one of the necessary conditions for the rationalization of pipe production system is that the various apparatus constituting the system should be so arranged that they can always develop their inherent capacities to the full.

The second object of the present invention is to improve the entire system in such a manner that the pipe-producing apparatus such as an extruded pipe-producing apparatus and a rolled pipe-producing apparatus can develop their inherent merits to the full, thereby to rationalize the pipe-producing operation.

More particularly, the object is to so arrange the entire system that aptitude for diversified but small quantity production which is a merit inherent in an extruded pipe-producing apparatus and aptitude for nondiversified but large quantity production which is a merit inherent in a rolled pipe-producing apparatus can always be developed to the full, thereby to rationalize the pipe-producing operation.

The third object of the invention is to so arrange the system that a maximum production capacity can be obtained at the lowest cost of installation, thereby to rationalize the pipe-producing operation.

In order to achieve the objects described above, the steel pipe production equipment of the present invention comprises the following unique arrangements.

There is provided a pipe production region consisting of two or more juxtaposed systems of pipe production lines. This pipe production region necessarily includes one system of a pipe production line having an extruded pipe-producing apparatus as the main component thereof. The main components of the other pipe production lines are selected from the group consisting of an extruded pipe-producing apparatus and a rolled pipe-producing apparatus.

There is also provided a pipe-treatment region which is disposed rearwardly of said pipe production region and in which one system including a hot rolling line and one or more systems including hot lines are disposed side by side.

The hot rolling line has a stretch reducer as the main component thereof serving to reduce the diameter of a steel pipe produced in the preceding pipe production region, thereby to make it a final product. The hot line is a line for after-treating a steel pipe produced in the pipe production region, without reducing as a rule, but may include a sizing mill as the main component thereof.

In addition to the above-mentioned arrangements, the system of the present invention is characteristically provided with transfer means for steel pipes. Thus, in the steel pipe production system of the present invention, the said two regions are interconnected by transfer means in such a manner that a steel pipe produced in the two or more systems of pipe production lines constituting said pipe production region may be selectively fed from any of the pipe production lines into any of the lines of the pipe-treatment region, namely the hot rolling line and hot lines.

The present invention is characterized in that the steel pipe production system is disposed and arranged in the manner described above, but it is to be noted that the effect obtainable thereby is not merely an algebraic sumlike effect obtained by the existence of two or more systems of pipe production lines, but is a synergistic effect to be later described.

Preferred embodiments of the present invention will now be described with reference to the accompanying drawings, in which.

Figure 1:
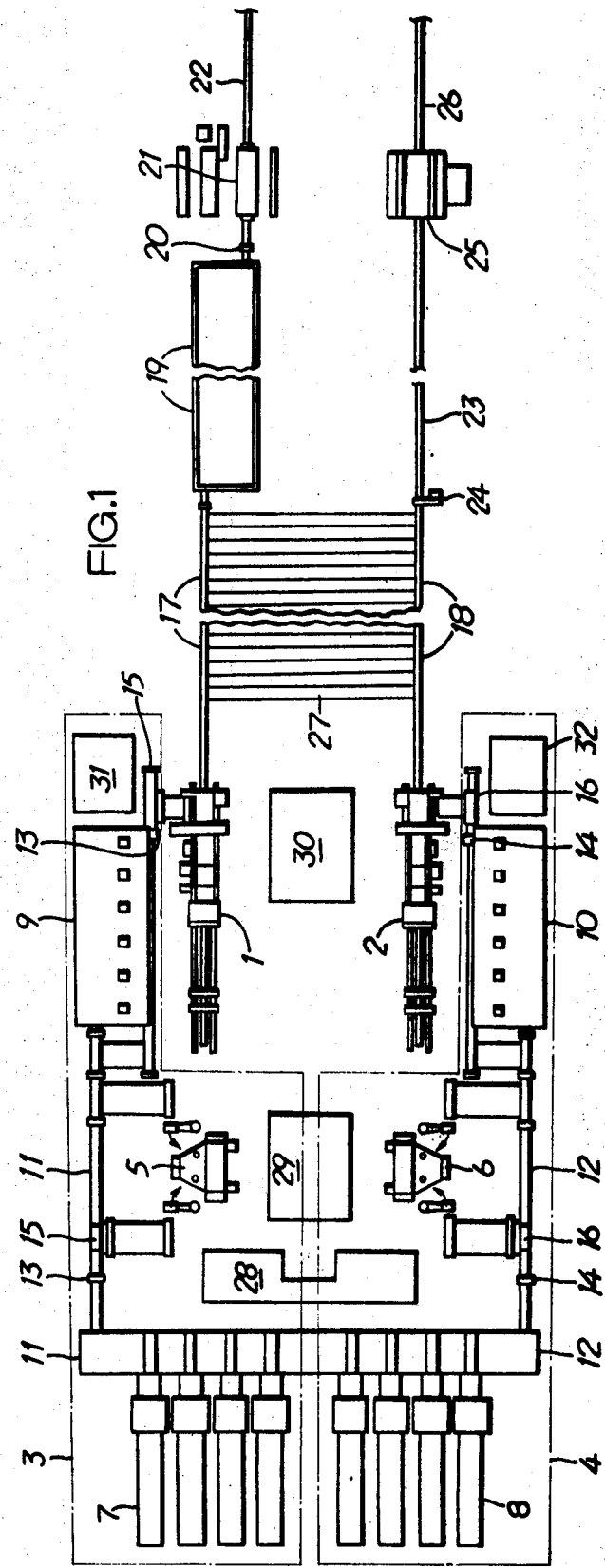
FIGS. 1 and 2 are plan views showing examples of steel pipe production system according to the invention.

The embodiment shown in FIG. 1 illustrates an example in which a pipe production region consisting of two systems of pipe production lines having extruded pipe-producing apparatus as the main component thereof and a steel pipe-treatment region consisting of one system including a hot rolling line and one system including a hot line are interconnected by steel pipe transfer means.

Thus, a first pipe production line consisting of a first extrusion press 1 and a second pipe production line consisting of a second extrusion press 2 are juxtaposed. In a section indicated at 3, and shown in a dot and dash line in the FIG., at the rear of the extrusion press 1, there is disposed a means for pretreating hollow billets to be supplied to said first extrusion press. The pretreating means and the first extrusion press 1 constitute the first pipe production line. On the other hand, in a section indicated at 4, shown in a dot and dash line in the FIG., at the rear of the second extrusion press 2, there is disposed a means for pretreating hollow billets to be supplied to the second extrusion press. The pretreating means and the second extrusion press 2 constitute the second pipe production line. Further, in the present invention and in a nonlimiting sense, the hollow billet pretreating means disposed in the sections 3 and 4 may generally comprise as the main components thereof piercing presses 5 and 6 for making hollow billets adapted for extruding from solid or narrow hole-bored billets by a piercing process, heating means 7 and 8 for heating the billets prior to said piercing operation, and reheating means 9 and 10 for reheating the billets to a temperature suitable for the extruding operation subsequent to said piercing operation, and they further comprise delivery transfer means 11 and 12 for delivering the billets and hollow billets between the above-mentioned means, descalers 13 and 14 for removing the scales of the billets and hollow billets formed upon heating, lubricant-applicating means 15 and 16 for applying lubricant to the billets and hollow billets prior to the piercing and extruding operations, etc.

Disposed at the rear of the pipe production region consisting of these two systems of pipe production lines is a steel pipe treatment region to be presently described.

Thus, at the steel pipe outlet side of the first extrusion press which is the main component of the first pipe production line, there is disposed in series a steel pipe taking-out conveyor 17, and subsequent to the outlet and of the steel pipe taking-out conveyor 17 there is disposed in series a hot rolling line. That is to say, a reheating furnace 19 is disposed as connected in series to the outlet end of the steel pipe taking-out conveyor 17, a descaler 20 is disposed at the outlet side of said reheating furnace 19, and a hot rolling machine 21 is disposed in series subsequent to said descaler 20. In the above-mentioned arrangement, a steel pipe (parent pipe for hot rolling) entering the hot rolling line from the steel pipe taking-out conveyor 17 enters the reheating furnace 19 where it is reheated to a temperature suitable for hot rolling, and the steel pipe which leaves the reheating furnace 19 has its scales former during heating removed by the descaler 20, and then the descaled steel pipe enters the hot rolling machine 21 whereby it is rolled to be a steel pipe of narrower diameter. The rolled steel pipe is delivered to any subsequent process by the taking-out conveyor 22.

On the other hand, at the outlet side of the second extrusion press 2 which is the main component of the second pipe production line, there is disposed in series a steel pipe taking-out conveyor 18, and subsequent to the outlet end of the taking-out conveyor 18, there is disposed in series the hot line. That is to say, a transfer table 23 is disposed continuous to the outlet end of said steel pipe taking-out conveyor 18 and adjacent the connection between said steel pipe taking-out conveyor 18 and said transfer table 23 there is disposed a pipe end cutting machine 24 and a constant length stand 25 is disposed toward the outlet end of the transfer conveyor 23. In the above-mentioned arrangement, of the steel pipes entering the hot line from the steel pipe taking-out conveyor 18, those steel pipes which must be further cold rolled or cold drawn have their front end cut by the pipe end cutting machine 24 and are then delivered to the next process via the transfer table 23. The constant length stand 25 comprises a stopper for the pipe, and cutting machine 24 is positioned at a predetermined distance from the stopper so that the pipe can be cut into a desired length. The stopper and cutter are relatively movable to adjust the length of the pipe. Further, those steel pipes which will become products in the as-extruded condition are directly delivered to any subsequent process via the transfer table 23, stand 25 and a discharge conveyor 26.

In the present invention, there is provided means whereby steel pipes leaving the steel pipe production line are selectively fed to any one of the lines, namely the hot rolling line and the hot line. That is to say, in this embodiment, connection is established between the steel pipe taking-out conveyors 17 and 18 by means of a transfer 27. Thereby, the steel pipes which come to the steel pipe taking-out conveyor 17 via the first pipe production line are treated in two alternative ways, one in which they are directly delivered to the reheating furnace 19 of the hot rolling line as the parent pipes for hot rolling, and the other in which they are transferred to the steel pipe taking-out conveyor 18 by the transfer 27 and then carried to the transfer conveyor 23 of the hot line. Conversely, the steel pipes which come to the steel pipe taking-out conveyor 18 via the second pipe production line are treated in two alternative ways, one in which they are directly delivered to the hot line as in the case described above, and the other in which they are delivered to the hot rolling line via the transfer 27 and the steel pipe taking-out conveyor 17.

Figure 2:
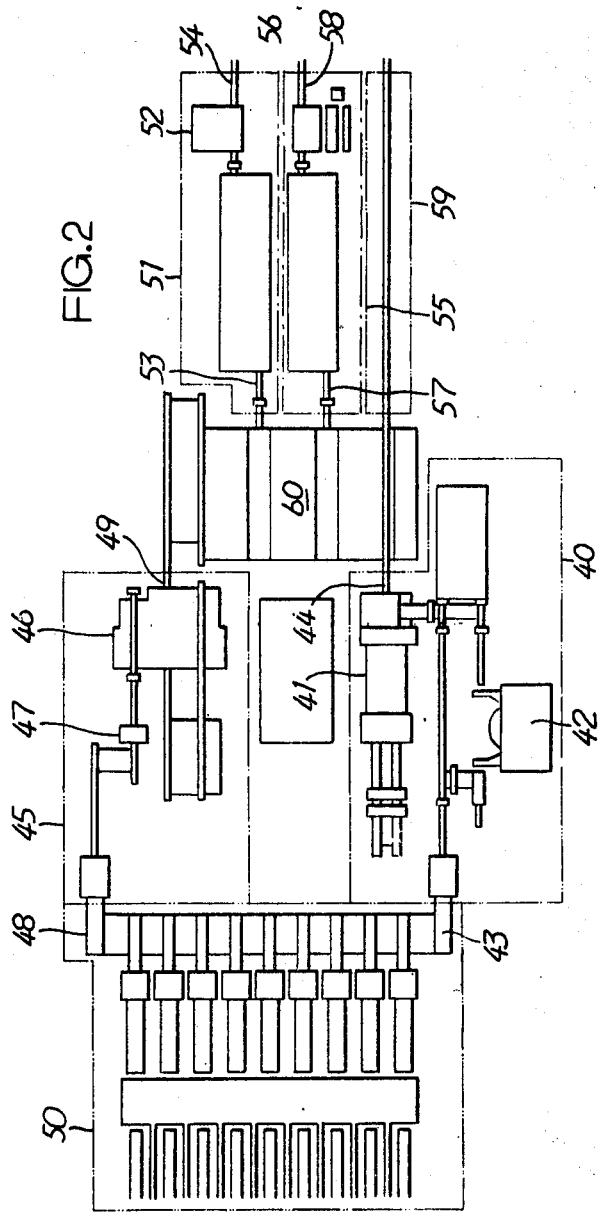
Figure 3:
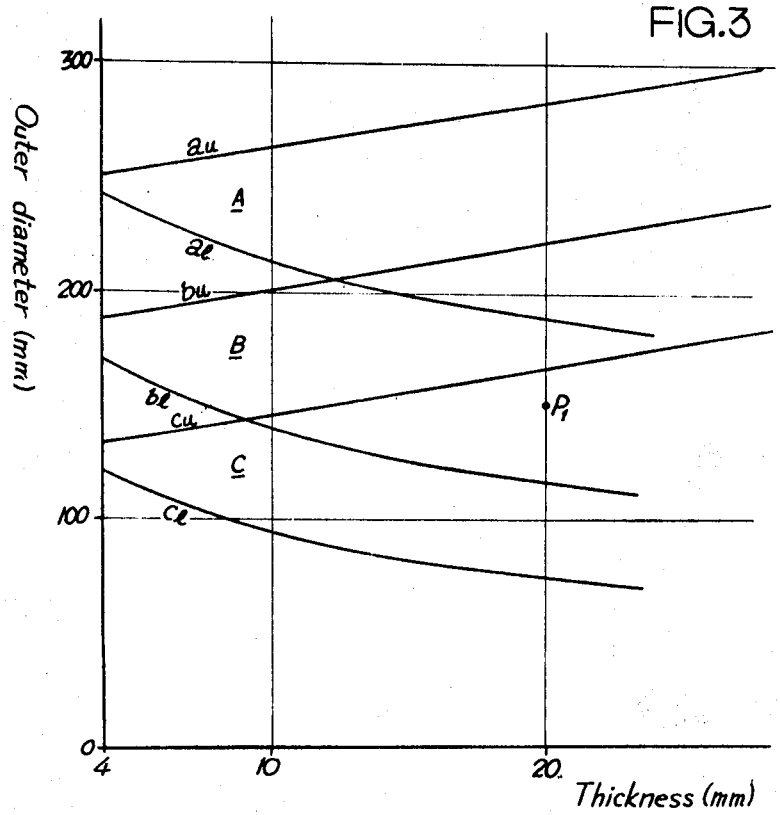
FIG. 3 is a graph showing the relation between the size of steel pipes and the capacity of a steel pipe-producing apparatus.

Next, the embodiment shown in FIG. 2 will now be described.

In this embodiment, the pipe production region is composed of two systems of pipe production lines, namely, a pipe production line having an extruded steel pipe-producing apparatus as the main component thereof and a pipe production line having a rolled pipe-producing apparatus as the main component thereof and the steel pipe-treatment region disposed rearwardly of said pipe production region is composed of one system including a stretch reducer line and two systems including hot lines.

In the Figure, the extrusion pipe production line is disposed in a region 40. This extrusion pipe production line has an extrusion press 41 and a piercing press 42 as the main components thereof, and also includes means associated with and corresponding to said two presses 41 and 42, such as a soaking pit, reheating means, a descaler, glass applicating means, intercomponent transfer means and other means known per se, and the billets which are supplied from a conveyor 43 at the inlet side of this line are made hollow billets by the piercing press 42, and the hollow billets are then extruded toward a conveyor 44 at the outlet side of this line by the extrusion press 41.

In the Figure, the rolling pipe production line is disposed in a region 45. In this case, the rolling pipe production line has a mandrel mill 46 and a piercing mill 47 as the main components thereof, and also includes means associated with and corresponding to said two mills 46 and 47, such as a soaking pit, centering means, mandrel inserting means, mandrel pulling-out means, a mandrel cooling bed, a descaler and other means known per se, and the billets which are supplied from a conveyor 48 at the inlet side of this line are made hollow billets by the piercing mill 47, and the hollow billets are then rolled toward a conveyor 49 at the outlet side of this line by the mandrel mill 46.

In addition, in this case, in upstream of said two regions 40 and 45, there is disposed in a region 50 billet heating means which supply both of the regions 40 and 45.

At the rear of the pipe production region consisting of said extrusion pipe production line and rolling pipe production line, there are disposed two systems including hot lines and one system including a reducer line.

Thus, in the Figure, the first hot line is disposed in a region 51. In this line is disposed a sizing mill 52 as the main component thereof. The hot line within region 51 also includes means known per se such as a heating furnace, a descaler and intercomponent transfer means, and the steel pipes which come in from a conveyor 53 at the inlet side of this line are sized by the sizing mill 52 and go out toward a conveyor 54 at the outlet side of this line. The sizing mill 52 is a mill wherein a pipe discharged from the press is passed in order to more precisely shape the same.

In the Figure, the stretch reducer line is disposed in a region 55. The stretch reducer line has a stretch reducer 56 as the main component thereof and also includes means known per se such as a heating furnace, a descaler and intercomponent transfer means, and the steel pipes (usually called parent pipes) which are supplied from a conveyor 57 at the inlet side of this line are rolled by the stretch reducer 56 to become narrower pipes, and then are discharged by a conveyor 58 at the outlet side of this line. The stretch reducer 56 is a reducing mill (or sinking mill) for more precisely controlling the diameter of the pipe, particularly of a seamless pipe of a diameter smaller than 600 mm.

In the Figure, the second hot line is disposed in a region 59. The second hot line is a line which makes the steel pipes extruded by said extrusion pipe production line pipe products in the as-extruded condition and includes means known per se such as end treating means for treating the end of the extruded steel pipe.

Further, the following means is employed.

Transfer means is disposed between the rolling pipe production line, the first and second hot line and the stretch reducer line. In this embodiment, a transfer 60 is provided, so that the steel pipes leaving the extrusion pipe production line may be selectively transferred by the transfer 60 to any one of the other pipe treatment lines, namely the stretch reducing line and the first hot line, and the steel pipes leaving the rolling pipe production line may be selectively transferred by the transfer 60 to any one of the other pipe treatment lines, namely the stretch reducer line and the second hot line.

Since, as described above, the present invention employs means whereby the steel pipes leaving the pipe production line may be selectively transferred to any one of the pipe treatment lines, namely the hot rolling line and the hot lines, the resulting merit is not confined to an increase in production capacity attributed to the existence of two or more systems of extrusion lines, but other important and significant merits are produced which are enumerated below.

1. The respective capacities of the lines can be effectively developed. In the use of these kinds of extrusion presses, the time from one extrusion to next one, namely the press cycle time is several times as long as the time required for the actual extruding operation. For example, in the steel pipe extruding press which is generally used, the extrusion time is 10 seconds or less, whereas the press cycle time is of the order of 60 seconds. This is because in this kind of steel pipe extruding operation, in addition to actual extruding work, many preparatory operations are required such as supplying of billets, cooling of mandrels, cleaning and cooling of containers, and cutting off of extrusion residues.

On the other hand, the hot rolling line and hot line have generally high efficiency, requiring only 10-odd seconds for treating each steel pipe. As explained above, despite the extremely good efficiencies of the hot rolling line and hot line, the efficiency of the total extrusion line itself is poor, with the result that the rates of operation of the hot rolling line and hot line in this kind of conventional steel pipe production system are very poor. If the amount of actual working hours of each line of the steel pipe treatment region is small, the rate of operation as considered from the entire pipe production equipment is low and hence the operation is not rationalized, even if each pipe production line in the pipe production region is operated to its utmost capacity.

In contrast thereto, in the present invention the effect is not confined to a mere algebraic sumlike effect resulting from the existence of two or more systems of pipe production lines which will simply increase production, but the actual working hours of the secondary line comprising the hot rolling line and hot line with respect to the pipe production line are greatly increased and conversely, the idle time is decreased.

Figure 4:
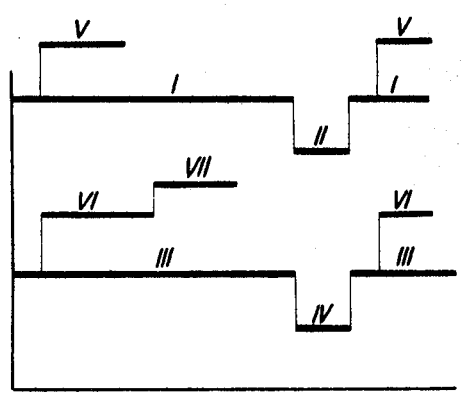
FIG. 4 is a diagram showing an example of a steel pipe production program.

These results are achieved by an arrangement wherein the steel pipes leaving the pipe production line can be selectively supplied to any one of the lines, namely the hot rolling line and hot line. In addition, the operation of transfer from one pipe taking-out conveyor to the other is carried out by utilizing the idle time of the pipe production line (the time other than that for pipe production); therefore there will be no adverse effect such as an increase in the press cycle time. In order to facilitate the understanding thereof, a program is shown by way of example in FIG. 4 wherein all the steel pipes leaving the extrusion line are supplied to the hot rolling line. In FIG. 4, I denotes a preparatory working period in the first extrusion line; II, an extrusion period in said first extrusion line; III, a preparatory working period in the second extrusion line; IV, an extrusion period in said second extrusion line; V, a hot rolling period for steel pipes leaving the first extrusion line; VI, a period during which a steel pipe leaves the second extrusion line and is transferred from the taking-out conveyor 18 toward 17; and VII, a hot rolling period for the thus transferred steel pipe.

2. While the merits possessed by each pipe producing apparatus can be fully developed, the demerits thereof can be remedied. Stated in more detail, for example, those pipe products which are in the range of size incapable of being produced by the rolled pipe producing apparatus, or those pipe products which are incapable of being produced in point of the type and shape of steel used are all produced by the extrusion system, while the rolling pipe production line has only to produce those kinds of pipes which can be produced with the capacity of said line developed to the full. Further, as for those pipe products which can be produced by the rolling system, if they are of small lot they may be produced by the extrusion pipe production line with which it is easy to change sizes. This is a very great advance in the art, considering that conventionally in this kind of pipe production systems even if they are of small lot they are produced with much effort as by rearranging the rolling rolls. In other words, in the present invention, without cancelling the respective merits of the rolling and extruding systems, their weak points can be avoided. Such results have never been achieved before the advent of the present invention employing transfer equipment.

3. The cost of installation is reduced. That is to say, according to the arrangement of the present equipment, the individual pipe production lines constituting the pipe production regions jointly use the individual lines in the succeeding steel pipe treatment regions, so that the cost of installation is greatly reduced as compared with the conventional arrangement wherein both a stretch reducer line and a hot line are provided for each pipe production line.

What I claim is:

1. A steel pipe production system comprising a pipe production region and a pipe treatment region; said pipe production region having two or more pipe production lines each including an extruded pipe producing apparatus; said steel pipe treatment region being positioned subsequent to said pipe production region and having one hot rolling line and one or more hot lines, said hot rolling line including a stretch reducer for reducing steel pipes supplied from said pipe production region, and said hot lines each including means for after-treating steel pipes supplied from said pipe production region; connection being established and transfer means located between said pipe production region and said pipe treatment region for enabling steel pipes from any of said pipe production lines to be selectively delivered to any one of said hot rolling line or said hot lines.

2. A steel pipe production system comprising a pipe production region and a pipe-treatment region; said pipe production region having a first pipe production line constituted by an extruded pipe-producing apparatus and a second pipe production line constituted by a hot rolled pipe-producing apparatus; said pipe-treatment region being positioned subsequent to said pipe production region and having one hot rolling line and one or more hot lines, said hot rolling line including a stretch reducer for reducing steel pipes supplied from said pipe production region, and said hot lines each including means for after-treating steel pipes supplied from said pipe production region; connection being established and transfer means located between said pipe production region and said pipe-treatment region for enabling steel pipes from either of said pipe production lines to be selectively delivered to any one of said hot rolling line or said hot lines.